US006446673B1

(12) United States Patent
Iio et al.

(10) Patent No.: US 6,446,673 B1
(45) Date of Patent: Sep. 10, 2002

(54) FUEL HOSE OF LOW FUEL PERMEABILITY

(75) Inventors: Shinji Iio, Komaki; Hiroaki Ito, Kasugai; Yoshimitsu Ishida, Komaki; Katsutoshi Mizuno, Kani; Tomohide Ito, Kasugai, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/040,496

(22) Filed: Jan. 9, 2002

(30) Foreign Application Priority Data

Jan. 12, 2001 (JP) ....................................... 2001-004519
Nov. 29, 2001 (JP) ....................................... 2001-364279

(51) Int. Cl.$^{7}$ ................................................ F16L 11/00

(52) U.S. Cl. ................. 138/137; 138/140; 138/DIG. 7; 428/36.9

(58) Field of Search ................................ 138/137, 140, 138/141, DIG. 7; 428/36.9, 36.91

(56) References Cited

U.S. PATENT DOCUMENTS

| | | | | | |
|---|---|---|---|---|---|
| 5,373,870 | A | * | 12/1994 | Derroire et al. | 138/125 |
| 5,380,385 | A | * | 1/1995 | Derroire et al. | 138/125 |
| 5,474,109 | A | * | 12/1995 | Stoeppelmann et al. | 138/137 |
| 5,566,720 | A | | 10/1996 | Cheney et al. | 138/137 |
| 5,750,626 | A | * | 5/1998 | Shimizu et al. | 525/133 |
| 5,884,671 | A | | 3/1999 | Noone et al. | 138/137 |
| 5,884,672 | A | | 3/1999 | Noone et al. | 138/137 |
| 5,937,911 | A | * | 8/1999 | Kodama et al. | 138/124 |
| 6,037,062 | A | * | 3/2000 | Tsutsumi et al. | 428/475.8 |
| 6,039,084 | A | * | 3/2000 | Martucci et al. | 138/131 |
| 6,054,537 | A | * | 4/2000 | Shimizu et al. | 525/133 |
| 6,230,749 | B1 | * | 5/2001 | Kertesz | 138/137 |
| 6,276,400 | B1 | * | 8/2001 | Jackson et al. | 138/137 |
| 6,293,312 | B1 | * | 9/2001 | Stripe | 138/137 |
| 6,321,794 | B1 | * | 11/2001 | Ishida et al. | 138/121 |

* cited by examiner

*Primary Examiner*—Patrick Brinson
(74) *Attorney, Agent, or Firm*—Jacobson Holman, PLLC

(57) ABSTRACT

A hose of low fuel permeability has a fuel permeability in a bent state with R50 not more than three times a fuel permeability in a straight state, R50 being a bent state where the hose has its longitudinal axis bent to form an arc having a diameter of 100 mm. Its low fuel permeability is achieved if the resin forming its inner wall layer has a melt viscosity falling within a certain range, which can be obtained by, for example, increasing the degree of polymerization of the resin, or grafting a specific side chain to the main chain in each molecule of the resin, or if the resin has a volume swelling degree falling within a certain range, which can be obtained by copolymerizing a monomer having fuel resistance, or blending a polymer having fuel resistance. The hose maintains its low fuel permeability even if it may be subjected to a large load of bending stress as when it is used to form a fluid conveying line.

20 Claims, No Drawings

FUEL HOSE OF LOW FUEL PERMEABILITY

BACKGROUND OF THE INVENTION

1. Field of the Invention

This invention relates to a fuel hose of low fuel permeability. More particularly, it relates to a hose which can maintain an excellently low level of fuel permeability even when it is subjected to a bending stress in practical use. The term "fuel" as herein used includes methanol, hydrogen gas, and other fuel for a fuel cell.

2. Description of the Related Art

Stricter restrictions have recently come to be imposed upon the leakage of fuel from motor vehicles, and brought about a strong demand for hoses of low fuel permeability, since fuel hoses are highly responsible for the leakage of fuel from motor vehicles. As a result, there have been made a large number of proposals covering fuel hoses having at least their innermost wall layers formed from a resin of low fuel permeability. Every such hose usually has a multilayer wall formed solely from resin layers, or including an outermost layer formed from a rubber material.

The fuel hoses are usually classified into liquid-line and vapor-line hoses, depending on the fluid which each hose is used to convey. The inside diameter of each hose, its shape, etc. are decided depending on the kind of fuel to be conveyed, its flow rate and the ease of hose assembly. The shape of the hose may be, for example, straight or bent, or smooth or corrugated.

The resin forming the innermost wall layer of a fuel hose is preferably a fluororesin, such as an ethylene-tetrafluoroethylene copolymer (ETFE), a tetrafluoroethylene-hexafluoropropylene-vinylidene fluoride terpolymer (THV), polyphenylene sulfide (PPS), polybutylene naphthalate (PBN) or polyvinylidene fluoride (PVDF), though specific kinds of other resins may be equally useful. Hoses of low fuel permeability having wall layers formed from fluororesins are disclosed in, for example, U.S. Pat. Nos. 5,884,671, 5,884,672, WO 98/5557, WO 99/45044, JP-A (Japanese Patent Application Laid-Open No.)-10-311461, JP-A (KOHYO)-10-503236, U.S. Pat. No. 5,566,720 and JP-A-7-173446. Hoses of low fuel permeability having wall layers formed from PPS are disclosed in, for example, JP-A-10-138372, JP-A-10-230556, JP-A-10-296889 and JP-A-2000-63669. Hoses of low fuel permeability having wall layers formed from PBN are disclosed in, for example, JP-A-2000-154890.

Fuel hoses are usually laid in a bent state in a motor vehicle for reasons of layout, or to allow displacement resulting from the collision of the vehicle. The inventors of this invention, have, however, found experimentally that a bent hose has craze in its wall, though it may not have any visible cracks. Craze is injurious to the low fuel permeability of the hose. None of the prior proposals, however, suggest any specific or effective means for overcoming such a defect of a bent hose.

SUMMARY OF THE INVENTION

It is, therefore, an object of this invention to provide a hose of low fuel permeability having specific and effective means for overcoming any adverse effect exerted by a bending stress upon its low fuel permeability.

According to a first aspect of this invention, there is provided a hose of low fuel permeability having a wall including an inner layer of a resin, wherein the hose has a fuel permeability in a bent state with R50 not more than three times a fuel permeability in its straight state. The bent state with R50 means that the hose has its longitudinal axis bent in a manner to form an arc having a diameter of 100 mm. The inventors experiments have revealed that the hose as defined above can maintain a practically satisfactorily low fuel permeability when it is subjected to various bending stresses in actual use. Thus, the hose of the first aspect is expected to have excellent low fuel permeability owing to its resin inner layer, and, due to its low fuel permeability in its bent state, the deterioration of low fuel permeability caused by bending is suppressed within a practically allowable range.

According to a second aspect of this invention, the hose is permeable to not more than 0.3 mg of fuel per square centimeter of its inner wall surface per day, as tested under specific conditions in its bent state with R50. Referring to the "specific conditions", the hose is filled with FC/E10 (which will be explained in the description of examples), and left to stand at a temperature of 40° C. for 168 hours. Then, the hose is emptied, filled with a fresh supply of FC/E10, weighed, and left to stand at 40° C. for 72 hours. Then, it is weighed again, its weight is compared with its prior weight and their difference is used to calculate the weight (mg) of the fuel lost per square centimeter of its inner wall surface per day. The practically allowable fuel permeability of any hose depends on the purpose for which it is used, but the hose according to the second aspect of this invention is satisfactory for a wide range of practical uses as a fuel hose.

According to a third aspect of this invention, the resin forming the inner wall layer of the hose is ETFE, THV, PPS, PBN or PVDF. Owing to its high fuel impermeability, every such resin is suited to realize the low fuel permeability of the hose in its bent state as in the first or second aspect.

According to a fourth aspect of this invention, the resin of the inner layer is so high in electrical conductivity as to have a volume specific resistance not exceeding $10^9$ ohms cm. The hose is not electrically charged to produce any spark when it is used to supply fuel to a gasoline tank, or when the engine is driven. The hose is, however, likely to form craze when bent, and it is, therefore, recommended that its features be combined with those of the hose according to the first or second aspect of this invention.

According to a fifth aspect of this invention, the hose has a corrugated wall along at least a part of its length. The corrugated wall is so adaptable to a bending force as to ensure the low fuel permeability of the hose to a further extent when it is bent.

According to a sixth aspect of this invention, the resin forming the inner wall layer of the hose has a melt viscosity as listed below at a shear rate of 100 $S^{-1}$:

ETFE: 500 to 3000 Pa·s (300° C.)

THV: 500 to 3000 Pa·s (280° C.)

PPS: 500 to 3000 Pa·s (310° C.)

PBN: 500 to 3000 Pa·s (270° C.)

PVDF: 1000 to 3000 Pa·s (210° C.)

The adjustment of the melt viscosity of the resin as listed above is one of particularly preferable examples of specific means for realizing the low fuel permeability of the hose in its bent state. If the resin has a higher viscosity, a low fuel permeability of the hose is less deteriorated when it is bent, but any resin having an extremely high melt viscosity is difficult to extrude.

According to a seventh aspect of this invention, the low fuel permeability of the hose in its bent state or the adjustment of the melt viscosity of the resin is made by:

(1) adjusting the degree of polymerization of the resin; or (2) grafting or copolymerizing a relatively long side chain to the main chain in each molecule of the resin, or crosslinking the resin. In either event, an increase in the mutual entanglement of macromolecules in the resin brings about a change of its melt viscosity to enable the formation of a resin layer which hardly forms any craze when the hose is subjected to a bending stress, thereby ensuring its low fuel permeability in its bent state.

According to an eighth aspect of this invention, the resin has a volume swelling degree as listed below after 360 hours of immersion in Fuel C (a mixture containing toluene and isooctane in a ratio of 50:50 and further containing 10% by volume of ethanol) at 60° C.:

ETFE: 3.0% or less;

THV: 3.0% or less;

PPS: 20.0% or less;

PBN: 7.0% or less;

PVDF: 7.0% or less.

The adjustment of the volume swelling degree of the resin as listed above is another preferable example of specific means for ensuring the low fuel permeability of the hose in its bent state.

According to a ninth aspect of this invention, the low fuel permeability of the hose in its bent state or the adjustment of the volume swelling degree of the resin is made by:

(3) copolymerizing a monomer having fuel resistance in the resin; or (4) blending a polymer having fuel resistance in the resin. In either event, a reduction in the compatibility of the resin with fuel brings about a reduction of its volume swelling degree to thereby make the hose hardly permeable to any fuel when it is subjected to a bending stress.

According to a tenth aspect of this invention, the low fuel permeability of the hose in its bent state is realized by:

(5) surrounding the inner layer by an outer layer of a resin having a flexural modulus of 600 MPa or below;

(6) reducing the residual oligomer and monomer in the resin forming the inner layer to a total of 2.0% by weight or less; or (7) adjusting the crystallinity of the resin forming the inner layer to 25% or above.

These are other preferable examples of specific means for ensuring the low fuel permeability of the hose in its bent state. The outer layer is flexible enough to adapt the hose satisfactorily to a load of bending stress and enable it to maintain its low fuel permeability when it is bent. The outer layer is also very effective for absorbing a bending stress to reduce any stress acting upon the inner layer. As the residual oligomer and monomer are considered to be one of the causes for any craze, their reduction makes craze less likely to occur and thereby enables the hose to maintain its low fuel permeability when it is bent. The increase of the crystallinity of the resin brings about a reduction of the amorphous phase in which craze is likely to occur under a bending stress, so that the hose may be able to maintain its low fuel permeability when it is bent.

According to an eleventh aspect of this invention, the hose is made by employing at least two of the seven means (1) to (7) recited in the seventh, ninth and tenth aspects of this invention. All of the seven means are effective even if they are used independently of one another. The means (1) to (4) are particularly effective. It is, however, still more effective to use at least two of the seven means (1) to (7) simultaneously.

According to a twelfth aspect of this invention, the hose has an outermost wall layer formed from a rubber material.

The above and other features and advantages of this invention will become more apparent from the following description.

DETAILED DESCRIPTION OF THE INVENTION

Construction of Hoses of Low Fuel Permeability

The hose of low fuel permeability according to this invention has at least an inner wall layer formed from a resin. Although the kind of resin is not limited, it is preferably of high fuel impermeability and is more preferably selected from among an ethylene-tetrafluoroethylene copolymer (ETFE), a tetrafluoroethylene-hexafluoropropylene-vinylidene fluoride terpolymer (THV), polyphenylene sulfide (PPS), polybutylene naphthalate (PBN) and polyvinylidene fluoride (PVDF).

Any ETFE can be used, but a preferred form of ETFE may be such that ethylene and tetrafluoroethylene have a molar ratio of, say, 70:30 to 30:70. Any THV can be used, but a preferred form of THV may be such that tetrafluoroethylene, hexafluoropropylene and vinylidene fluoride have a molar ratio of, say, 40 to 85:5 to 20:5 to 55 (making a total of 100), and more preferably 60 to 85:5 to 20:5 to 35.

Any PPS can be used. A common form of PPS maybe a polymer containing 70 mol % or more of structural units (residual monomer groups) as shown by formula 1 below.

formula 1

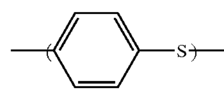

It is also possible to use a polymer containing less than 30 mol % of at least one kind of structural units shown by one of formulas 2 to 7 below, and 70 mol % or more of the structural units shown by formula 1. Such a polymer is of improved toughness, impact resistance and tensile properties.

formula 2

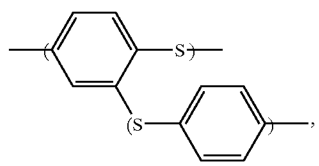

formula 3

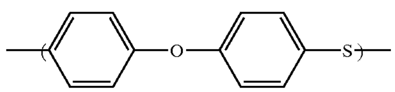

formula 4

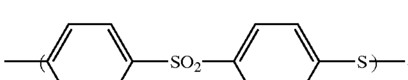

formula 5

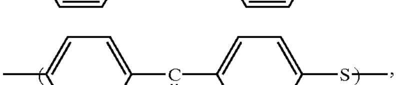

formula 6

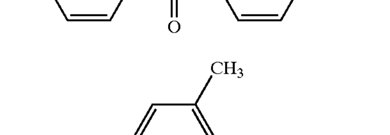

-continued formula 7

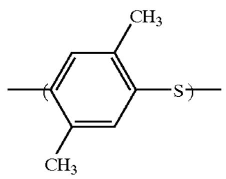

It is also preferable to use flexible PPS obtained by mixing an olefin polymer with any of various forms of PPS as mentioned above. A preferred olefin polymer has at least one kind of monomer selected from among ethylene, propylene, butene-1,4-methylpentene-1, hexene-1, decene-1, octene-1, or has at least one kind of functional group selected from among an epoxy group, a carboxyl group, a salt thereof, an acid anhydride group and a carboxylic ester.

It is also possible to combine a plurality of forms of PPS to form a laminate for the inner wall layer of the hose. The inner wall layer may, for example, be a two-layer structure composed of an inner layer of flexible PPS and an outer layer of common PPS (of relatively high rigidity) to fit well a pipe connected with the hose, or improve the impact resistance of the hose. It may also be a three-layer structure composed of an inner and an outer layer, both of flexible PPS, and an intermediate layer of common PPS interposed therebetween.

Any PBN can be used, but it is preferable to use, for example, a condensation product of tetramethylene glycol and 2,6-naphthalenedicarboxylic acid. It is also preferable to use flexible PBN obtained by copolymerizing a flexible component, such as an ether or ester segment or obtained by alloying an elastomer component, with butylene naphthalate. It is also preferable to use any such PBN having its end carboxyl groups hindered.

It is also possible to combine a plurality of forms of PBN to form a laminate for the inner wall layer of the hose. The inner wall layer may, for example, be a two-layer structure composed of an inner layer of flexible PBN and an outer layer of common PBN of relatively high rigidity to fit well a pipe connected with the hose, or improve the impact resistance of the hose. It may also be a three-layer structure composed of an inner and an outer layer, both of flexible PBN, and an intermediate layer of common PBN interposed therebetween.

Any PVDF can be used, but it is preferable to use a homopolymer of vinylidene fluoride (VDF). It is also suitable to use flexible PVDF obtained by copolymerizing VDF and chlorotrifluoroethylene (CTFE). In a copolymer of VDF and CTFE, VDF and CTFE preferably have a molar ratio of 98:2 t 85:15.

It is also possible to combine a plurality of forms of PVDF to form a laminate for the inner wall layer of the hose. The inner wall layer may, for example, be a two-layer structure composed of an inner layer of flexible PVDF and an outer layer of a PVDF homopolymer of relatively high rigidity to fit well a pipe connected with the hose, or improve the impact resistance of the hose. It may also be a three-layer structure composed of an inner and an outer layer, both of flexible PVDF, and an intermediate layer of a PVDF homopolymer interposed therebetween.

The resin forming the inner wall layer preferably contains a metal salt, more preferably KCl or $MgCl_2$, and still more preferably 0.05 to 3% by weight thereof. The metal salt serves as a nucleating agent to divide the resin crystals more finely and thereby lower the fuel permeability of the layer to a further extent. The metal salt may be added to the resin by any method not limited, for example, by mixing the salt directly with the molten resin, or dipping the resin in a solution of the salt. It is also suitable to add an inorganic salt, such as calcium carbonate or talc.

The resin forming the inner wall layer is preferably electrically conductive by containing any known material making it conductive, such as carbon black, carbon nanotubes or a metal powder. More specifically, it preferably has a volume specific resistance not exceeding $10^9$ ohms cm.

The inner wall layer may be surrounded by a single or multiple outer wall layer. The outer layer may be formed from any adequate resinous material of high flexibility, impact resistance and cold resistance that can be selected from among the materials of the inner wall layer as mentioned above, or other resinous materials. Examples of adequate materials are polyamides, thermoplastic polyamide elastomers, polyolefins, thermoplastic olefin elastomers, polyesters and thermoplastic polyester elastomers. A material having an amine content of $4\times10^{-5}$ gram equivalent per gram or more is, among others, preferred for its good adhesiveness to ETFE, THV or PVDF forming the inner wall layer. A material having a high amine content can be obtained by various methods, for example, mixing a resin and a diamine, or other amino compound in a molten state, or modifying with an amino group any carboxyl group that the resin may have.

The hose preferably has an outermost wall layer formed from an adequate kind of rubber material having high levels of chipping, weather, flame and cold resistance. Examples of such material are an ethylene-propylene-diene terpolymer rubber (EPDM), ethylene-propylene rubber (EPM), chlorosulfonated polyethylene rubber (CSM), a blend of acrylonitrile-butadiene rubber and polyvinyl chloride (NBR-PVC), a blend of NBR and EPDM (NBR-EPDM) and chlorinated polyethylene rubber (CPE).

The hose according to this invention may have its inside diameter and shape depend upon the fluid which it is supposed to convey (liquid or vapor), the purpose of its specific use, or the flow rate of the fluid to be conveyed. Its shape may be straight or curved, or smooth or at least partly corrugated. A corrugated hose is superior in its adaptability to any bending stress.

The hose according to this invention may be used as a fuel hose for a motor vehicle, or anything else as long as it is intended for convenying liquid or gaseous fuel. It can be used for both a liquid and a vapor line as a fuel hose for a motor vehicle. Specific examples include its use as a feed hose, a return hose, a breather (vent) hose, a filler hose or an evaporation hose. The hose may have an outside diameter of 4 to 50 mm, depending upon its use.

Means for Withstanding a Load of Bending Stress

The hose according to this invention relies upon at least one of the means (1) to (7) which will be explained below, for withstanding a load of bending stress, so that its wall may have not more than three times as high a fuel permeability in a bent state with R50 as in its straight state. The hose preferably relies upon two or more such means. Preferred combinations of means are (1)+(2), (1)+(3), (1)+(4), (2)+(3), (1)+(2)+(3), (1)+(6), (1)+(7), (1)+(6)+(7), (2)+(6)+(7) and (3)+(6)+(7).

R50 means that the hose is so bent that its longitudinal axis forms an arc having a diameter of 100 mm. The fuel permeability of the hose may be calculated from an average value of reduction in gross weight of the hose filled with test fuel, which can be determined by, for example, filling it with a specific kind of test fuel, closing it tightly at both ends, leaving it to stand at a predetermined temperature for a specific length of time, replacing the fuel with a fresh supply of test fuel and repeating such a process for a specific period of time. The fuel permeability of the hose in a bent state is compared with that in a straight state, and is not more than three times higher.

The specific value of fuel permeability of the hose according to this invention in its bent state with R50 is not necessarily limited, since it. depends upon the field of its use. According to the second aspect of this invention, however, the hose is permeable to not more than 0.3 mg of fuel per square centimeter of its inner wall surface per day, as tested under the specific conditions.

Means (1)

Means (1) is the adjustment of degree of polymerization of the resin forming the inner wall layer of the hose, as stated before. It is difficult to give a specific value covering the degree of polymerization as required of every resin, since it differs with the resin, or the monomers employed therefor. Means (1) is, therefore, carried out by adjusting the melt viscosity of the resin to a specific range as stated below.

The melt viscosity to be obtained is, therefore, at least 500 Pa·s (300° C.) for ETFE, at least 500 Pa·s (280° C.) for THV, at least 500 Pa·s (310° C.) for PPS, at least 500 Pa·s (270° C.) for PBN, or at least 1000 Pa·s (210° C.) for PVDF when tested at a shear rate of 100 $S^{-1}$. The resin is, however, difficult to extrude if its melt viscosity is too high. The maximum melt viscosity does, therefore, not exceed 3000 Pa·s (300° C.) for ETFE, 3000 Pa·s (280° C.) for THV, 3000 Pa·s (310° C.) for PPS, 3000 Pa·s (270° C.) for PBN, or 3000 Pa·s (210° C.) for PVDF when tested at a shear rate of 100 $S^{-1}$.

Means (2)

Means (2) is the grafting or copolymerization of a relatively long side chain to the main chain in each molecule of the resin forming the inner wall layer of the hose. Examples of the side chain are hexafluoroisobutylene, perfluorobutylethylene, $CH_2{=}CF{-}(CF_2)_2{-}COOH$, $CH_2{=}CF{-}(CF_2)_2{-}CH_2COOH$, $CH_2{=}CF{-}(CF_2)_3{-}COOH$, $CH_2{=}CF{-}(CF_2)_4{-}CH_2COOH$, $CH_2{=}CFCF_2OCF(CF_3)COOH$, $CF_2{=}CFO{-}(CF_2)_2{-}COOH$, $CF_2{=}CFO{-}(CF_2)_3{-}COOH$, $CF_2{=}CFO{-}(CF_3)_4{-}COOH$ (Compound A), $CF_2{=}CFOCF_2CF(CF_3)O{-}(CF_2)_2{-}COOH$ and $CH_2{=}CF(CF_2)_4{-}COOH$.

The side chains may be introduced to the ends of the main chains, or located unevenly on the main chains as in the case of a block copolymer of monomers having side chains. The side chains are preferably introduced to random positions on the main chains, so that stress may bear uniformly upon all the molecules of the resin and be less likely to form craze. The side chains to be grafted or copolymerized and the amount thereof differ with the resin forming the inner wall layer and cannot be defined specifically. They should be found out through an attempt to obtain any resin having an adequate range of melt viscosity as stated above in connection with means (1). The adjustment of the melt viscosity can be made in the case of crosslinking, too, if an adequate crosslinking agent, such as a bifunctional or trifunctional group, is selected.

Means (3)

Means (3) is the copolymerization of a monomer having fuel resistance as a component of the resin forming the inner wall layer of the hose. Examples of monomers having fuel resistance are equal to the examples of compounds listed above as components of side chains in connection with means (2) . See also the description of means (2) for the positions where such monomers are to be introduced into the resin.

The monomer to be copolymerized and the molar ratio thereof differ with the resin and cannot be defined specifically. They should be found out through an attempt to obtain any resin having an adequate degree falling within a specific range when it swells in volume with fuel. The adequate volume swelling degree does not exceed 3.0% for ETFE or THV, 20.0% for PPS, or 7.0% for PBN or PVDF.

Means (4)

Means (4) is the blending of a polymer having fuel resistance with the resin forming the inner wall layer. Examples of such polymers are a vinylidene fluoride-hexafluoropropylene copolymer, a vinylidene fluoride-hexafluoropropylene-tetrafluoroethylene terpolymer, polychlorotrifluoroethylene, a vinylidene fluoride-chlorotrifluoroethylene copolymer and an acrylonitrile-butadiene copolymer. The polymer to be blended and the amount thereof differ with the resin and cannot be defined specifically. They should be found out through an attempt to obtain any resin having an adequate volume swelling degree as stated above in connection with means (3).

Means (5)

Means (5) is the provision of an outer wall layer formed about the inner wall layer from a resin having a flexural modulus not exceeding 600 MPa. Such a resin is obtained by incorporating a plasticizer, or elastomer, or by copolymerizing a soft segment, or preferably by both. The outer wall layer is of improved flexibility and thereby improves the adaptability of the hose to a load of bending stress. Particularly it is preferable to adjust the flexural modulus of the outer wall layer to 450 MPa or less.

Means (6)

Means (6) is the reduction of the residual oligomer and monomer in the resin forming the inner wall layer to 2.0% by weight or less. As those residual substances are considered responsible for craze, their reduction makes craze less likely to occur and thereby improves the adaptability of the hose to a load of bending stress.

Means (7)

Means (7) is the adjustment of the crystallinity of the resin forming the inner wall layer to 25% or above. More specifically, it may be realized by employing a selected polymer structure, slow cooling after extrusion molding, or annealing after molding. An alloy of PPS with a polyolefin polymer, for example, is low in fuel resistance and crystallinity. Its annealing, however, raises its crystallinity and thereby makes craze less likely to occur. The higher crystallinity means a reduction of the amorphous phase in which craze is likely to occur, and thereby makes craze less likely to occur from any bending stress. As a result, the hose is improved in its adaptability to a load of bending stress.

Manufacture of Hoses

Any known process can be employed without any particular limitation for manufacturing the hose according to this invention. The layers forming the wall of the hose are preferably made by extrusion. The inner and outer resin layers are preferably made by co-extrusion, i.e., extruding the molten materials for those layers concentrically and simultaneously, and causing them to adhere to each other. Their co-extrusion may be performed by using any known apparatus including co-extrusion heads. Co-extrusion is suitable for a hose having a multilayer wall formed by two to six layers.

An outermost rubber layer is preferably formed by extrusion about the resin layers (inner wall layer, or inner and outer wall layers), though any other method can also be employed. A corrugated hose having a corrugated portion along at least a part of its wall length is preferably made by extruding a molten resin into a smooth tube and forming a corrugated portion in its wall by an appropriate corrugating mold or like device, though any other method can also be employed.

DESCRIPTION OF THE PREFERRED EMBODIMENTS

Manufacture of Hoses

Fuel hoses were prepared as shown at Examples 1 to 18 and Comparative Examples 1 to 14 in Tables 1 to 8 below. Each hose was made by the co-extrusion of an inner wall layer of a resin having a thickness of 0.4 mm and an outer wall layer of a resin having a thickness of 1.1 mm (or a total thickness of 1.1 mm if the outer layer is composed of two layers) to form a tube, and the corrugation of a part of the tube in a mold to form a corrugated wall portion having an outside diameter of 19 mm.

Each hose had an inside diameter of 13 mm and each hose having a corrugated wall portion had an inner wall surface area of about 710 $cm^2$ per meter of its length, while each hose not having any corrugated wall portion had an inner wall surface area of about 410 $cm^2$ per meter of its length.

Each of the hoses according to Examples 1 to 12 and Comparative Examples 1 to 10 had its inner wall layer formed from ETFE, THV, PPS, PBN or PVDF, as shown in Table 1 or 2. Polyamide 12 (PA12) was used to form the outer wall layer. In a hose having an inner wall layer of PPS or PBN, the outer wall layer is composed of two layers, i.e. an outermost layer of PA 12 and an inside layer of an adhesive resin.

The following is an explanation of each of ETFE1 to ETFE5, THV1 to THV5, PPS1 to PPS4, PBN1 to PBN4 and PVDF1 to PVDF4 shown in Tables 1 and 2 as the materials for the inner wall layers of the hoses, including information on the monomer compositions of some materials, a blend of resins and a thickened resin, as well as its melt viscosity determined at a shear rate of 100 $S^{-1}$. When the inner wall layers are formed of ETFE, THV or PVDF, PA12 having an amine content of $5\times10^{-5}$ gram equivalent per gram is used.

ETFE1: ETFE having a melt viscosity of 1000 Pa·s (300° C.);

ETFE2: ETFE having a melt viscosity of 400 Pa·s (300° C.);

ETFE3: ETFE containing 46 mol % of ethylene, 51.5 mol % of tetrafluoroethylene, 1.0 mol % of perfluorobutylethylene and 1.5 mol % of Compound A as monomers and having a melt viscosity of 800 Pa·s (260° C.);

ETFE4: ETFE having a volume swelling degree of 2.3%;

ETFE5: ETFE having a volume swelling degree of 4.2%;

THV1: THV containing 71 mol % of tetrafluoroethylene, 13 mol % of hexafluoropropylene and 16 mol % of vinylidene fluoride as monomers and having a melt viscosity of 1000 Pa·s (280° C.);

THV2: THV having the same monomer composition with THV1 and having a melt viscosity of 400 Pa·s (280° C.);

THV3: THV containing 71 mol % of tetrafluoroethylene, 12 mol % of hexafluoropropylene, 16 mol % of vinylidene fluoride and 1 mol % of perfluorobutylethylene as monomers and having a melt viscosity of 1200 Pa·s (280° C.);

THV4: THV having a volume swelling degree of 1.4%;

THV5: THV having a volume swelling degree of 4.4%;

PPS1: An alloy prepared by blending 100 parts by weight of PPS, 5 parts by weight of a resin containing 88% of ethylene and 12% of glycidyl methacrylate as monomers and 10 parts by weight of a resin containing 82% of ethylene and 18% of butene as monomers, and having a melt viscosity of 1000 Pa·s (310° C.);

PPS2: PPS having a melt viscosity of 400 Pa·s (310° C.);

PPS3: PPS having a volume swelling degree of 16.8%;

PPS4: PPS having a volume swelling degree of 24.8%;

PBN1: PBN thickened by a trifunctional crosslinking agent and having a melt viscosity of 1000 Pa·s (270° C.);

PBN2: PBN having a melt viscosity of 200 Pa·s (270° C.);

PBN3: PBN having a volume swelling degree of 5.4%;

PBN4: PBN having a volume swelling degree of 8.2%;

PVDF1: PVDF containing 95% of vinylidene fluoride and 5% of chlorotrifluoroethylene as monomers and having a melt viscosity of 2000 Pa·s (210° C.);

PVDF2: PVDF having a melt viscosity of 400 Pa·s (210° C.);

PVDF3: PVDF having a volume swelling degree of 5.6%;

PVDF4: PVDF having a volume swelling degree of 9.1%.

Each of the hoses according to Example 13 and Comparative Example 11 as shown in Table 3 had an inner wall layer of ETFE2 and an outer wall layer of PA12. The polyamide used for Example 13 had a flexural modulus of 400 MPa and that for Comparative example 11 had a flexural modulus of 1000 MPa.

The hose according to Example 14 or Comparative Example 12 as shown in Table 4 had an inner wall layer formed from ETFE6 or ETFE7 having a controlled residual oligomer content. ETFE6 had a residual oligomer content of 0.2% by weight and ETFE7 had a residual oligomer content of 2.6% by weight, both determined by calculation from a reduction of weight as observed from the extraction of the resin with Freon.

Both of the hoses according to Example 15 and Comparative Example 13 as shown in Table 5 had an inner wall layer of PPS and an outermost wall layer of PA12. PPS5 used for Example 15 had a crystallinity of 40%, while PPS6 for Comparative Example 13 had a crystallinity of 20%, both as determined by an X-ray diffraction method.

Both of the hoses according to Example 16 and Comparative Example 14 as shown in Table 6 had an inner wall layer of ETFE2 and an outer wall layer of PA12 and a corrugated wall portion having a different form of corrugations from each other. The ridges and grooves forming the corrugations were rounded on the hose according to Example 16, but had acute angles on the hose according to Comparative Example 14.

The hose according to Example 17 as shown in Table 7 had an inner wall layer of ETFE8 and an outer wall layer of PA12. ETFE8 was obtained by introducing the side chain (Compound A) in ETFE3 into a random position on its main chain.

The hose according to Example 18 as shown in Table 8 had an inner wall layer of PVDF5 and an outer wall layer of PA12. PVDF5 was obtained by adding 1% by weight of potassium chloride to PVDF1.

Evaluation

Each hose was tested for fuel permeability in a natural or straight state as molded and in a bent state in which its corrugated wall portion was held with a radius of curvature of R50. A fuel permeability test was conducted by filling the hose with a mixture containing Fuel C as test gasoline and 10% of ethanol (FC/E10), leaving it to stand at a temperature of 40° C. for 168 hours, emptying the hose, filling it with a fresh supply of FC/E10, weighing it, leaving it to stand at a temperature of 40° C. for 72 hours and weighing it again to find any difference in weight. This difference was used to calculate the fuel permeation (mg) of the hose per meter of its length (having an inner wall surface area of about 710 $cm^2$) per day. The results are shown in each table as Permeability. The value given in parentheses for each hose in a bent state indicates the number of times of its permeability in its bent state over that in its straight state.

TABLE 1

| | | Example | | | | | | | Comparative Example | | | | |
|---|---|---|---|---|---|---|---|---|---|---|---|---|---|
| | | 1 | 2 | 3 | 4 | 5 | 6 | 7 | 1 | 2 | 3 | 4 | 5 |
| ETFE1 | | O | | | | | | | | | | | |
| ETFE2 | | | | | | | | | O | | | | |
| ETFE3 | | | O | | | | | | | | | | |
| THV1 | | | | O | | | | | | | | | |
| THV2 | | | | | | | | | | O | | | |
| THV3 | | | | | O | | | | | | | | |
| PPS1 | | | | | | O | | | | | | | |
| PPS2 | | | | | | | | | | | O | | |
| PBN1 | | | | | | | O | | | | | | |
| PBN2 | | | | | | | | | | | | O | |
| PVDF1 | | | | | | | | O | | | | | |
| PVDF2 | | | | | | | | | | | | | O |
| Permea-bility | In a straight state | 2.2 | 2.5 | 1.6 | 1.8 | 0.6 | 1.2 | 1.3 | 2.4 | 1.8 | 0.9 | 1.5 | 1.2 |
| | In a bent state | 2.5(1.1) | 42(1.7) | 1.8(1.1) | 2.6(1.4) | 1.2(1.5) | 1.8(1.5) | 2.0(1.5) | 20.3(8.5) | 15.4(8.6) | 9.2(10.2) | 12.8(8.5) | 5.6(4.7) |

TABLE 2

| | Volume swelling | Example | | | | | Comparative Example | | | | |
|---|---|---|---|---|---|---|---|---|---|---|---|
| | degree | 8 | 9 | 10 | 11 | 12 | 6 | 7 | 8 | 9 | 10 |
| ETFE4 | 2.3 | O | | | | | | | | | |
| ETFE5 | 4.2 | | | | | | O | | | | |
| THV4 | 1.4 | | O | | | | | | | | |
| THV5 | 4.4 | | | | | | | O | | | |
| PPS3 | 16.8 | | | O | | | | | | | |
| PPS4 | 24.8 | | | | | | | | O | | |
| PBN3 | 5.4 | | | | O | | | | | | |
| PBN4 | 8.2 | | | | | | | | | O | |
| PVDF3 | 5.6 | | | | | O | | | | | |
| PVDF4 | 9.1 | | | | | | | | | | O |
| Permeability | In a straight state | 2.3 | 1.5 | 0.8 | 1.1 | 1.4 | 2.3 | 1.5 | 1.0 | 1.0 | 1.2 |
| | In a bent state | 5.5(2.4) | 2.6(2.0) | 1.6(2.0) | 2.6(2.4) | 1.8(1.3) | 8.5(3.7) | 6.4(4.3) | 8.6(8.6) | 4.5(4.5) | 4.9(4.1) |

TABLE 3

| | Example 13 | Comparative Example 11 |
|---|---|---|
| PA12 | ○ | |
| PA12 | | ○ |
| Permeability | | |
| In a straight state | 2.4 | 2.8 |
| In a bent state | 20.3(8.5) | 50.5(18) |

TABLE 4

| | Example 14 | Comparatve Example 12 |
|---|---|---|
| ETFE6 | ○ | |
| ETFE7 | | ○ |
| Permeability | | |
| In a straight state | 2.0 | 2.2 |
| In a bent state | 3.2(1.6) | 25.9(11.8) |

TABLE 5

| | Example 15 | Comparative Example 13 |
|---|---|---|
| PPS5 | ○ | |
| PPS6 | | ○ |
| Permeability | | |
| In a straight state | 1.3 | 1.4 |
| In a bent state | 1.9(1.5) | 8.5(6.1) |

TABLE 6

| | Example 16 | Comparative Example 14 |
|---|---|---|
| Convolution configuration 1 | ○ | |
| Convolution configuration 2 | | ○ |
| Permeability | | |
| In a straight state | 2.6 | 2.3 |
| In a bent state | 19.5(7.5) | 35.9(15.6) |

TABLE 7

| | Example 17 |
|---|---|
| ETFE8 | ○ |
| Permeability | |
| In a straight state | 2.4 |
| In a bent state | 3.2(1.3) |

TABLE 8

| | Example 18 |
|---|---|
| PPS5 | ○ |
| Permeability | |
| In a straight state | 1.0 |
| In a bent state | 1.5(1.5) |

While the invention has been described by way of its preferred embodiments, it is to be understood that variations or modifications may be easily made by those skilled in the art without departing from the scope of this invention which is defined by the appended claims.

What is claimed is:

1. A hose of low fuel permeability having a wall including an inner layer of a resin, wherein the hose has a fuel permeability in a bent state with R50 not more than three times a fuel permeability in its straight state, R50 being defined as a bent state where the hose has its longitudinal axis bent to form an arc having a diameter of 100 mm.

2. The hose according to claim 1, wherein the hose in its bent state is permeable to at most 0.3 mg of fuel per square centimeter of its inner wall surface per day, as tested under specific conditions.

3. The hose according to claim 1, wherein the resin is selected from the group consisting of an ethylene-tetrafluoroethylene copolymer (ETFE), a tetrafluoroethylene-hexafluoropropylene-vinylidene fluoride terpolymer (THV), polyphenylene sulfide (PPS), polybutylene naphthalate (PBN) or polyvinylidene fluoride (PVDF).

4. The hose according to claim 2, wherein the resin is selected from the group consisting of an ethylene-tetrafluoroethylene copolymer (ETFE), a tetrafluoroethylene-hexafluoropropylene-vinylidene fluoride terpolymer (THV), polyphenylene sulfide (PPS), polybutylene naphthalate (PBN) or polyvinylidene fluoride (PVDF).

5. The hose according to claim 1, wherein the resin has a volume specific resistance of at most $10^9$ ohms cm.

6. The hose according to claim 2, wherein the resin has a volume specific resistance of at most $10^9$ ohms cm.

7. The hose according to claim 1, wherein the hose has a corrugated portion along at least a part of its length.

8. The hose according to claim 2, wherein the hose has a corrugated portion along at least a part of its length.

9. The hose according to claim 3, wherein each of ETFE, THV, PPS and PBN has a melt viscosity of 500 to 3000 Pa·s at 300° C. (ETFE), at 280° C. (THV), at 310° C. (PPS) and at 270° C. (PBN), and PVDF has a melt viscosity of 1000 to 3000 Pa·s at 210° C.

10. The hose according to claim 4, wherein each of ETFE, THV, PPS and PBN has a melt viscosity of 500 to 3000 Pa·s at 300° C. (ETFE), at 280° C. (THV), at 310° C. (PPS) and at 270° C. (PBN), and PVDF has a melt viscosity of 1000 to 3000 Pa·s at 210° C.

11. The hose according to claim 1, wherein the resin has its melt viscosity obtained by at least one of (1) and (2):

(1) adjusting the degree of polymerization of the resin; and (2) grafting or copolymerizing a relatively long side chain to the main chain in each molecule of the resin, or crosslinking the resin.

12. The hose according to claim 2, wherein the resin has its melt viscosity obtained by at least one of (1) and (2):

(1) the adjustment of its degree of polymerization; and (2) grafting or copolymerizing a relatively long side chain to the main chain in each molecule of the resin, or crosslinking the resin.

13. The hose according to claim 3, wherein each of ETFE and THV has a volume swelling degree of at most 3.0%, PPS has a volume swelling degree of at most 20.0% and each of PBN and PVDF has a volume swelling degree of at most 7.0%.

14. The hose according to claim 4, wherein each of ETFE and THV has a volume swelling degree of at most 3.0%, PPS has a volume swelling degree of at most 20.0% and each of PBN and PVDF has a volume swelling degree of at most 7.0%.

15. The hose according to claim 1, wherein the hose has its low fuel permeability or the resin has its volume swelling degree, each obtained by at least one of (3) and (4):

(3) the copolymerization of a monomer having fuel resistance as a component of the resin; and (4) the blending of a polymer having fuel resistance with the resin.

16. The hose according to claim 2, wherein the resin has its volume swelling degree obtained by at least one of (3) and (4):

(3) the copolymerization of a monomer having fuel resistance as a component of the resin; and (4) the blending of a polymer having fuel resistance with the resin.

17. The hose according to claim 1, wherein the low fuel permeability of the wall in its bent state is obtained by at least one of (5) to (7):

(5) forming an outer wall layer about the inner layer from a resin having a flexural modulus of at most 600 MPa;

(6) reducing the residual oligomer and monomer in the resin forming the inner layer to a total of at most 2.0% by weight; and (7) raising the crystallinity of the resin forming the inner layer to at least 25%.

18. The hose according to claim 2, wherein the low fuel permeability of the wall in its bent state is obtained by at least one of (5) to (7):

(5) forming an outer wall layer about the inner layer from a resin having a flexural modulus of at most 600 MPa;

(6) reducing the residual oligomer and monomer in the resin forming the inner layer to a total of at most 2.0% by weight; and (7) raising the crystallinity of the resin forming the inner layer to at least 25%.

19. The hose according to claim 1, wherein the low fuel permeability of the wall is obtained by at least two of the following:

(1) adjusting the degree of polymerization of the resin forming the inner layer;

(2) grafting or copolymerizing a relatively long side chain to the main chain in each molecule of the resin, or crosslinking the resin;

(3) copolymerizing a monomer having fuel resistance as a component of the resin;

(4) blending a polymer having fuel resistance with the resin;

(5) forming an outer wall layer about the inner layer from a resin having a flexural modulus of at most 600 MPa;

(6) reducing the residual oligomer and monomer in the resin forming the inner layer to a total of at most 2.0% by weight; and (7) raising the crystallinity of the resin forming the inner layer to at least 25%.

20. The hose according to claim 2, wherein the low fuel permeability of the wall is obtained by at least two of the following:

(1) adjusting the degree of polymerization of the resin forming the inner layer;

(2) grafting or copolymerizing a relatively long side chain to the main chain in each molecule of the resin, or crosslinking the resin;

(3) copolymerizing a monomer having fuel resistance as a component of the resin;

(4) blending a polymer having fuel resistance with the resin;

(5) forming an outer wall layer about the inner layer from a resin having a flexural modulus of at most 600 MPa;

(6) reducing the residual oligomer and monomer in the resin forming the inner layer to a total of at most 2.0% by weight; and (7) raising the crystallinity of the resin forming the inner layer to at least 25%.

* * * * *